Sept. 15, 1970     D. L. FERRIS ET AL     3,528,630
PITCH AND FOLD MECHANISM FOR A TILTABLE ROTOR USABLE
IN AN AIRCRAFT CAPABLE OF HELICOPTER
AND PROPELLER MODES OF OPERATION
Filed March 20, 1968     7 Sheets-Sheet 1

INVENTORS
DONALD L. FERRIS
GEORGE J. HOWARD, JR.

BY Vernon F. Hauschild

ATTORNEY

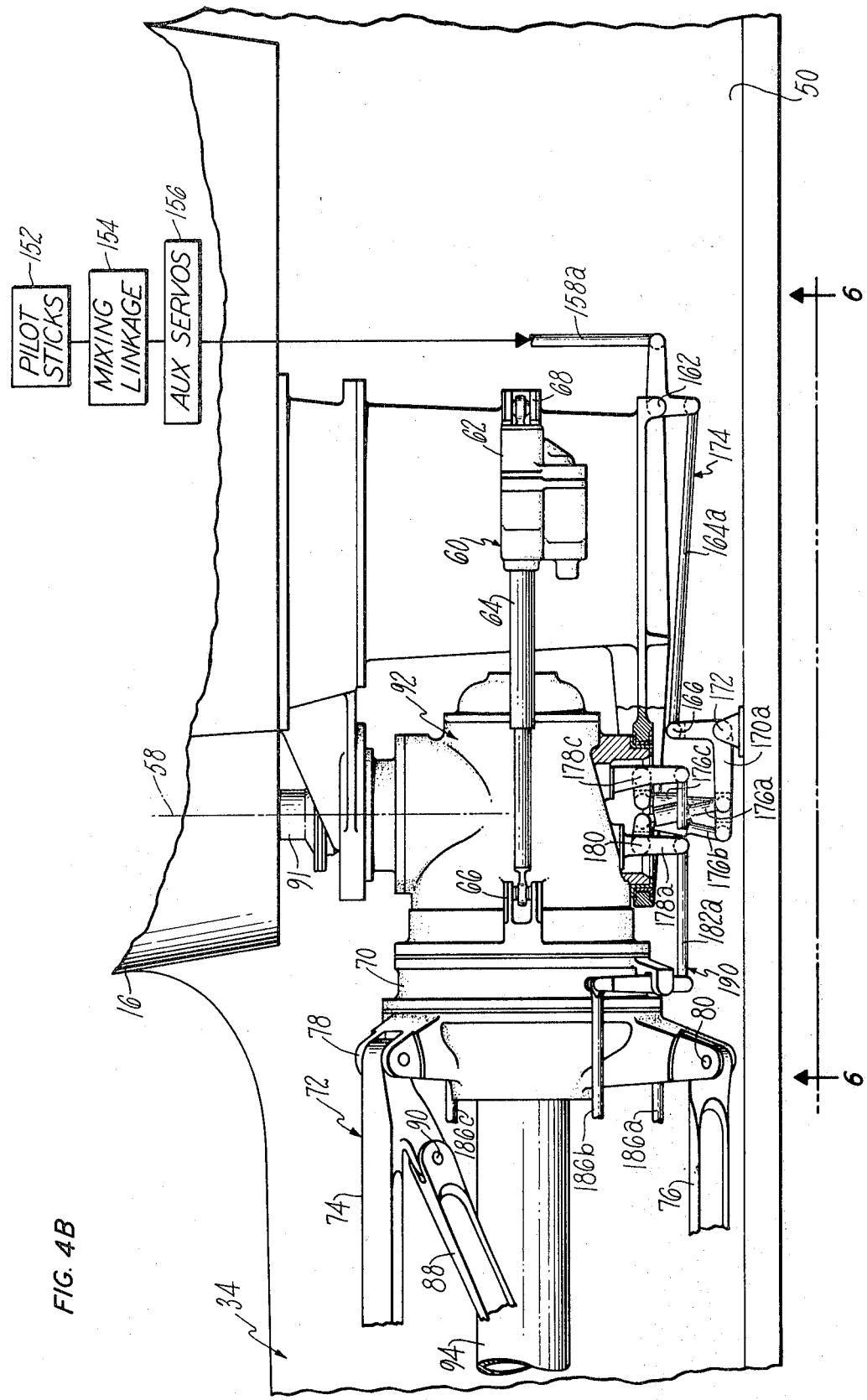

Sept. 15, 1970         D. L. FERRIS ET AL         3,528,630
    PITCH AND FOLD MECHANISM FOR A TILTABLE ROTOR USABLE
             IN AN AIRCRAFT CAPABLE OF HELICOPTER
                AND PROPELLER MODES OF OPERATION
Filed March 20, 1968                        7 Sheets-Sheet 4

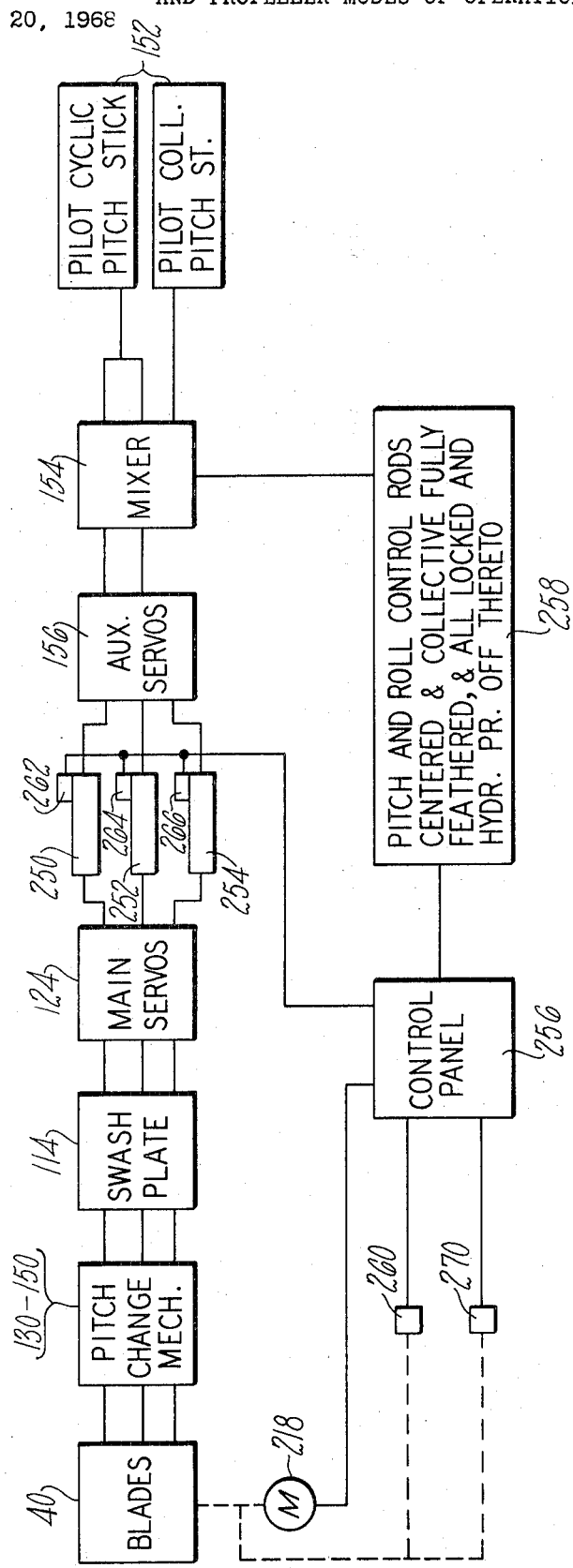

United States Patent Office 3,528,630
Patented Sept. 15, 1970

3,528,630
PITCH AND FOLD MECHANISM FOR A TILTABLE ROTOR USABLE IN AN AIRCRAFT CAPABLE OF HELICOPTER AND PROPELLER MODES OF OPERATION
Donald L. Ferris, Newtown, and George J. Howard, Jr., Fairfield, Conn., assignors to United Aircraft Corporation, East Hartford, Conn., a corporation of Delaware
Filed Mar. 20, 1968, Ser. No. 714,591
Int. Cl. B64c 27/22; B65c 27/52
U.S. Cl. 244—7                 33 Claims

ABSTRACT OF THE DISCLOSURE

A tiltable rotor supported from an aircraft actuatable between a vertical position for helicopter mode of operation and a horizontal position for propeller mode or fixed wing cruise mode of operation and including provisions for tilting the pod and for folding the blades and with further provisions for varying the pitch of the blades both during normal flight operation and during the folding operation so that the blades may feather and fold and so that the pod may be tilted without introducing inadvertent blade pitch changes.

BACKGROUND OF THE INVENTION

This invention relates to aircraft of the compound variety which are capable of flying in more than one mode of operation, such as helicopter mode, propeller mode, and fixed-wing cruise mode, and more particularly to rotor pods which are tiltably attached to the tips of the fixed wings of the aircraft so as to be tiltable between a vertical position for helicopter mode of operation and a horizontal position for propeller and fixed wing modes of operation and so that the rotor blades may be folded in flight for fixed wing cruise mode of operation.

In the prior art, there has been no requirement for in-flight folding of the blades of a rotor since such folding normally took place on the ground to permit storage of the aircraft in the smallest possible place as taught in U.S. Pat. Nos. 2,925,130 and 3,097,701. This requirement for blade folding in flight on an aircraft utilizing a tiltable pod for helicopter and propeller modes of operation brings with it the requirement of a mechanism for tilting the pod and for supporting the rotor blades for their normal motions such as blade flapping and, the very important requirement of being able to vary the pitch of the blades during the normal flight operations and during folding by the use of mechanism which is unaffected by blade flapping, folding, or pod tilting. In addition, since the rotor blades must be folded in flight, it is highly desirable that the rotor blades assume the pitch position of minimum aerodynamic drag both during the folding and unfolding operations and when fully folded. Since this minimum drag position is the full feathered position throughout most of the folding and unfolding operations, it is desirable to be able to maintain the helicopter blades at their full feathered positions during the major portion of the fold or unfold operation and to change pitch thereof at the end of the folding travel so that the blades will assume a folded pitch position best suited to nesting or storage against the pods. This in-flight blade folding requirement also brings with it the requirement that the mechanism which effects blade pitch change during normal flight operation not interfere with the mechanism which effects blade pitch change during the folding and unfolding operations and vice versa.

The prior art was not faced with this problem of in-flight folding of blades, particularly on tilt pod rotor propelled aircraft.

SUMMARY OF THE INVENTION

In accordance with the present invention, tiltable pods are positioned at the tips of the wings of an aircraft and support a rotor or a propeller for rotation therefrom and includes provisions for tilting the pod between its vertical or helicopter mode position and its horizontal or propeller mode position and for varying the pitch of the rotor blades both during normal flight operation in either the helicopter or propeller mode and during the blade folding and unfolding operations.

In accordance with the further aspect of this invention, the blade folding and the pod tilting mechanism is designed with respect to the blade pitch change mechanisms so that pod tilting and blade flapping and folding produce no inadvertent pitch change.

In accordance with still another aspect of this invention, each pod is provided with a translatable nose cone which translates away from the pod to permit the blades to assume their normal operating position without interference from the nose cone and translates toward and abuts the pod to provide a smooth aerodynamic surface therewith when the blades are in their folded positions.

It is a further aspect of this invention that the pitch control mechanism includes a chain of interconnected links and bell cranks, one of which passes through and is coincident with the blade flapping and folding hinge and at least one other of which is substantially coincident with the pod tilt axis.

It is still a further aspect of this invention, that the pitch change link and bell crank chain include a portion which is fixed with respect to the aircraft and fixed pod portion and a portion which tilts with the remainder of the pod and which includes at least one twist link joining the movable chain portion to the stationary chain portion.

It is still a further aspect of this invention to provide blade folding and unfolding mechanism which will not interfere with the normal blade flapping motion.

It is still a further aspect of this invention to provide a first blade pitch change mechanism for use during normal rotor operation in the helicopter and propeller modes of operation and a second pitch change mechanism operable during the folding and unfolding operations of the blades and in which the two pitch change mechanisms operate separately and independently of one another.

It is still a further feature of this invention that the rotor blades are mounted on the rotor hub so that the blade fold and blade flapping axes of each blade are coincident.

This invention permits stowing of the rotor blades when folded into a streamline configuration of the pod with an aerodynamically shaped nose cone and rotor pod cooperating to define a smooth flow surface and to envelope the rotor hub, the pod tilt mechanism, the rotor support and the blade pitch change mechanism and with the folded rotor blades nested into recesses in the exterior thereof.

This invention further permits rotor blade flapping both during the helicopter and propeller modes of operation.

This invention further teaches a movable nose cone which is actuated in response to the blade folding and unfolding mechanism to be positioned in the most desirable position during blade folding and unfolding so as to avoid interference between the nose cone and the blades.

BRIEF DESCRIPTION OF THE DRAWINGS

FIGS. 4A and 4B are to be viewed together and constitute a top view of the tiltable rotor supporting pod shown projecting from the tip of an aircraft fixed-wing and partially broked away to better illustrate the rotor control mechanisms.

FIG. 9 is a showing of the blade pitch control mechanism used during the blade folding operation and shown in conjunction with the normal rotor operation pitch control mechanisms.

DESCRIPTION OF THE PREFERRED EMBODIMENT

Figure 1:
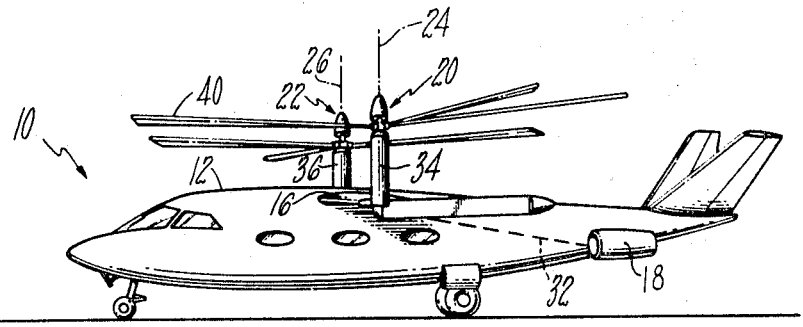
FIG. 1 is a showing of a compound aircraft, such as a convertiplane, in the helicopter mode of operation and employing this invention.
Figure 2:
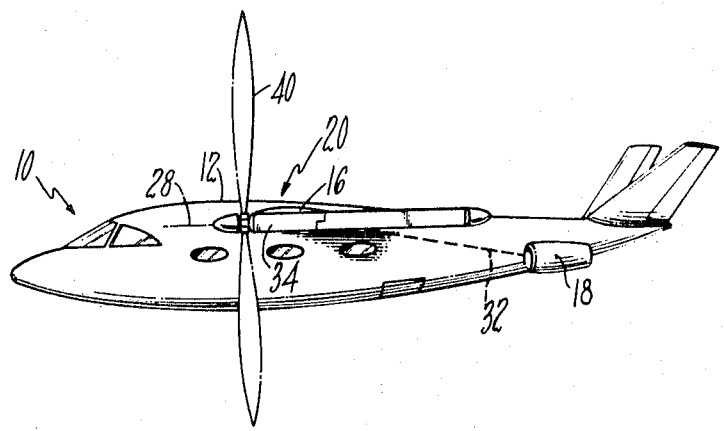
FIG. 2 is a showing of such a convertiplane in the propeller mode of operation and employing this invention.
Figure 3:
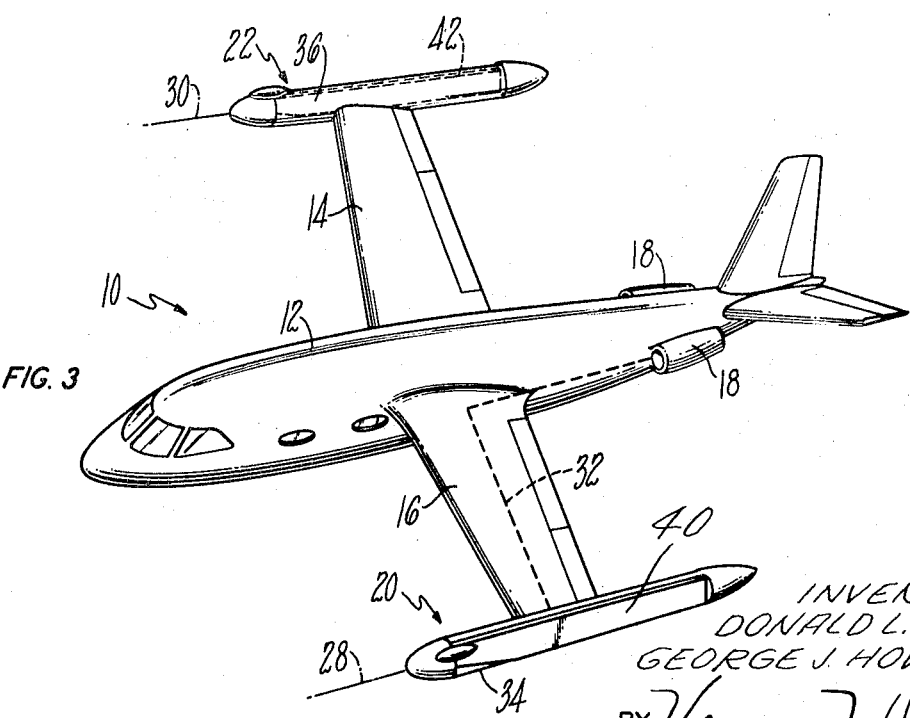
FIG. 3 is a showing of such a convertiplane in the fixed-winged mode of operation with the blades folded as in this invention.

Referring to FIGS. 1, 2, and 3 we see convertiplane 10 which includes fuselage 12 with fixed wings 14 and 16 projecting laterally on opposite sides thereof in conventional fashion. Engines such as jet-type engines 18 may be carried on the aircraft wings, fuselage or tail or any of these for the purpose of propelling the convertiplane in fixed-wing flight mode as shown in FIG. 3. In addition to fixed-wing cruise mode of operation as shown in FIG. 3, convertiplane 10 is also capable of helicopter mode of operation as shown in FIG. 1 and propeller mode of operation as shown in FIG. 2. Convertiplane 10 includes two rotors or propellers 20 and 22, which are mounted to be pivotable between their FIG. 1 helicopter mode position and the FIG. 2 propeller mode position.

In the FIG. 1 position the rotor blades revolve about vertical axes 24 and 26 so that convertiplane 10 is operating in helicopter mode. In the FIG. 2 position, rotors 20 and 22 rotate about horizontal axes of rotation 28 and 30, which axes are substantially 90° from axes 24 and 26, so the convertiplane 10 is operating in a propeller mode of operation. In either the helicopter or propeller mode of operation, engines such as 18 are mechanically connected through conventional linkage 32 to drive rotors 20 and 22. Rotors 20 and 22 are carried in segmented, tiltable pods or housings 34 and 36, which are positioned at the tips of fixed-wings 14 and 16 and are movable with respect thereto between axes 24 and 26 and axes 28 and 30. Engine 18 may be of the type shown in U.S. Pat. Nos. 2,711,631 and 2,747,367. When convertiplane 10 is to be operated in the FIG. 3 fixed-wing cruise mode of operation, it is necessary that the blades of rotors 20 and 22 be folded in flight so as to present minimum drag during flight.

Folding of the blades takes place as part of the transition process from the propeller mode to the fixed-wing cruise mode. If transition is to be made from the helicopter mode to the fixed-wing mode, transition should first be made to the propeller mode, and then to the fixed-wing cruise mode.

All helicopter blades, such as 40 and 42 must accordingly be foldable in flight during transition between one of the other modes and the fixed-wing mode.

Now referring to FIGS. 4 through 6 we see one of the two tilt pods and rotors in greater particularity and it should be borne in mind that the other pod 36 is similar in all respects to pod 34 which will now be described but allochiral thereto. Pod 34 is segmented and includes rear fixed portion 50, which is fixed with respect to the outer tip of port or left wing 16, and forward, tiltable portion 52, which is tiltable with respect to the tip of wing 16 between a vertical position as shown in FIG. 1 for helicopter mode of operation and a horizontal position shown in FIGS. 2 and 3 for either the propeller or fixed-wing cruise modes of operation. The forward end of pod 34 is open at 54 and abuts against translatable nose cone 56, which may be translated in a manner to be described in greater particularity hereinafter, between its FIG. 4A phantom position wherein it coacts with the other elements of tiltable pod 52 to define a smooth aerodynamic surface over which atmospheric air will flow without drag in flight during the fixed-wing cruise mode of operation and its solid line position shown in FIG. 4A during the process of blade unfolding. Pod tiltable portion 52, together with rotor 20 which it carries and nose cone 56 are tiltable about the pod tilt axis 58, shown in FIG. 4B. Pod tilting is caused by pod tilt actuator 60, which includes hydraulic cylinder-piston unit 62, the piston of which is caused to reciprocate hydraulically and cause rod 64 to translate therewith. Pod tilt actuator 60 is pivotally attached to the tiltable portion 52 of pod 34 at pivot point 66, which is offset from pod tilt axis 58, and is pivotally attached to either wing 16 or the fixed portion 50 of pod 34 at pivot point 68. By viewing FIGS. 4B and 6 it will be noted that as hydraulic cylinder-piston unit 62 causes rod 64 to translate it effectively changes the length of rod 64 and causes the tiltable portion 52 of pod 34 to pivot about pod tilt axis 58 between its FIG. 1 vertical position and its FIGS. 2 and 3 horizontal positions.

Rotor 20 is supported for rotation by pod 34 from transmission housing 70 to which rotor truss support 72 attaches. Rotor truss support 72 preferably includes three equally spaced support arms, two of which are shown at 74 and 76 and which are attached at points 78 and 80 to the transmission housing 70. The opposite ends of the three rods such as 74 and 76 are attached at points such as 82 to housing 84 of supporting bearing 86. Lateral supports 88 extend between the three support rods such as 74 and 76 and are preferably integral with one and attached to the other point such as 90. Engine driven shaft 91, which is driven by one or more engines 18, enters transmission 92, which is a conventional design and with appropriate speed reduction, drives main rotor drive shaft 94. Transmission 92 supports one end of main rotor shaft 94 and the other end is supported by bearing 86 and bearing support 84 through truss unit 72. Rotor drive shaft 94 is received in and drives rotor hub 96 about rotor axis of rotation 28. Hub assembly 96 is splined to rotor shaft 98.

Figure 4A:
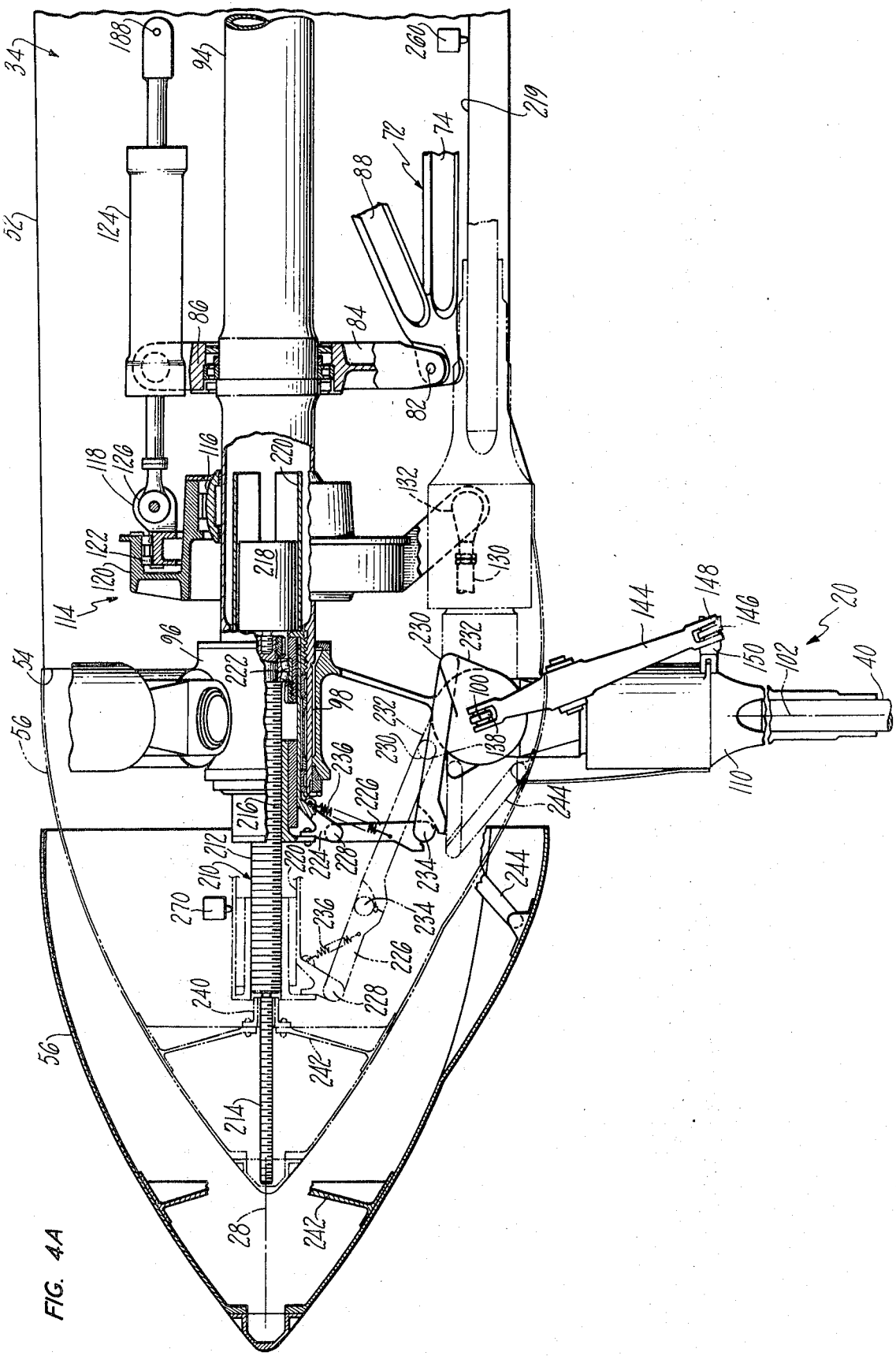
Figure 5:
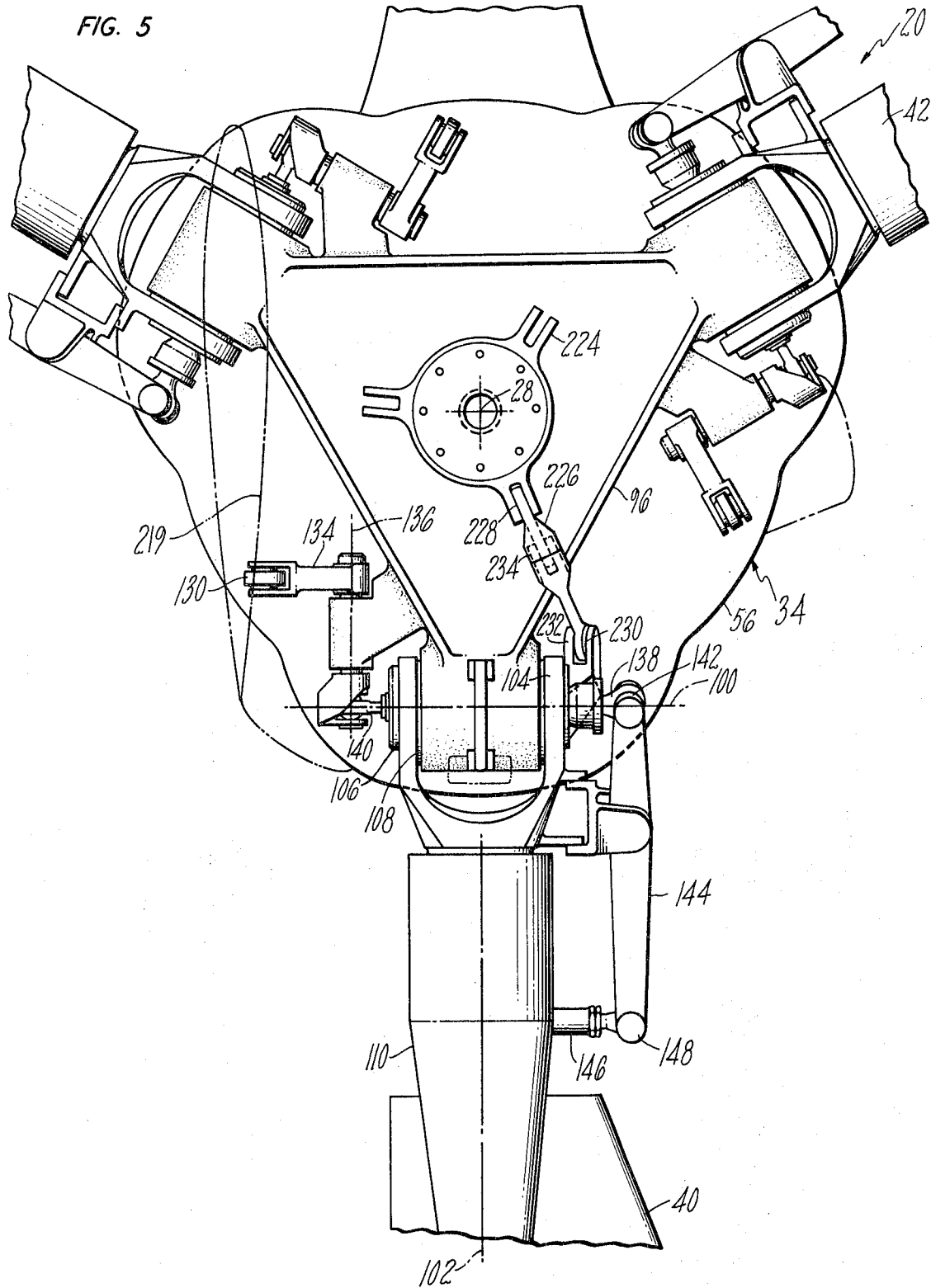
FIG. 5 is a front view of the mechanism shown in FIG. 4 with the nose cone removed to permit a viewing of the associated mechanism.

As best shown in FIGS. 4A and 5, rotor blades such as 40 are attached to hub 96 for rotation therewith about axis 28 and for flapping motion with respect thereto about blade flapping axis 100 and for feathering with respect thereto about blade feathering axis 102. Blade 40 is attached to hub assembly 96 articulately about flapping axis 100 since blade spindle 104 is pivotally attached to flapping pin 106, which is in turn pivotally supported in cylindrical aperture 108 of hub assembly 96. The opposite end of blade spindle 104 is received concentrically within blade sleeve 110 to support blade sleeve 110 and the remainder of blade 40 through stack bearing (not shown) so that sleeve 110 and the remainder of blade 40 is pivotable about feathering axis with respect to the spindle 104 and hub assembly 96 to vary blade pitch. Greater particulars with respect to the construction of blade 40 may be mound in U.S. Pat. No. 2,754,918 which is hereby incorporated by reference.

Figure 8:
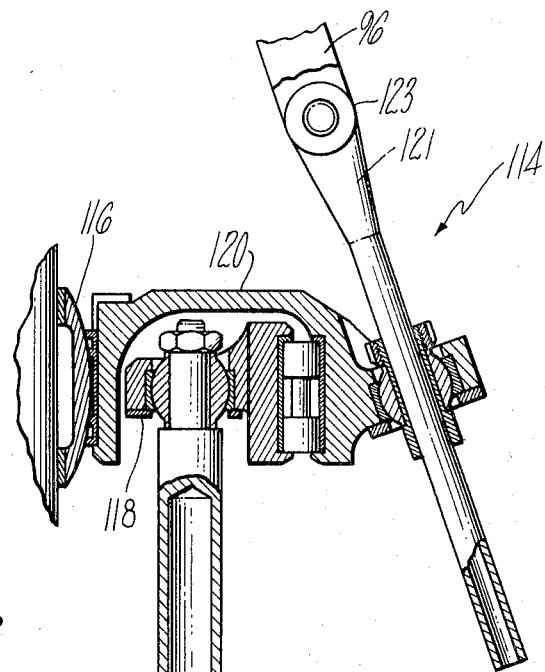
FIG. 8 illustrates the rotating and stationary scissors used with the blade pitch change swash plate.

Blades 40 are caused to change pitch both collectively and cyclically by swash plate assembly 114 which is mounted on helicopter drive shaft 94 about spherical bearing 116. Swash plate assembly 114 includes stationary portion 118, which does not rotate with rotor 20 and rotatable portion 120, which does rotate with rotor 20. Swash plate sections 118 and 120 are connected through bearing 122. As best shown in FIG. 8, the fixed portion 118 of swash plate assembly 114 is held with respect to transmission 92 by stationary scissors 119 which is attached at their opposite end to transmission housing. In addition, rotating scissors 121 is connected to swash plate rotating portion 120 and is pivotally connected at end 123 to rotor hub 96 so as to cause the rotating portion 120 of swash plate assembly 114 to rotate with rotor hub 96. Three main servos, which are equally spaced circumferentially about and extend parallel to axis 28 and a representative one of which is shown at 124 to be pivotally attached to swash plate assembly 114 at pivot point 126 and will be actuatable in a fashion now to be described to either cause swash plate assembly 114 to translate along axis 28 of helicopter drive shaft 94 or to tilt with respect thereto about spherical bearing 116. The translation of swash plate 114 causes collective pitch change of the blades 40, while tilting thereof causes cyclic pitch changing thereof due to the interconnection between swash plate assembly 114 and blades 40. Three links such as 130 are pivotally connected to swash plate at pivot 132 and are pivotally connected at their opposite ends to pivotable crank 134, which is supported for rotation about axis 136 in rotor hub 96. The opposite end of crank member 134 is pivotally attached to link 138 is pivotally attached at its opposite end 142 to pivot arm 144.

It is a very important teaching of this invention that link 138 extend along and be translatable along blade flapping and folding axis 100 so that the blade folding and flapping motion does not introduce inadvertent pitch change to the blades. The opposite end of pivot link 144 is connected to link 146 at pivot point 148. Link 146 is pivotally connected to pitch change arm or horn 150, FIG. 4A, which in turn is connected to blade sleeve 110 so that motion of pitch horn 150 causes blade sleeve 110 and the remainder of the blade 40 to rotate about feathering axis 102 and thereby change the pitch of the blades 40. Therefore, it will be seen that translation of swash plate 114 through link and bell crank chain 130–150 will cause collective pitch variation of blades 40, while tilting of swash plate 114, due to the same link and bell crank chain 130–150, will cause cyclic pitch variation of blades 40 as rotor 20 rotates.

Figure 6:
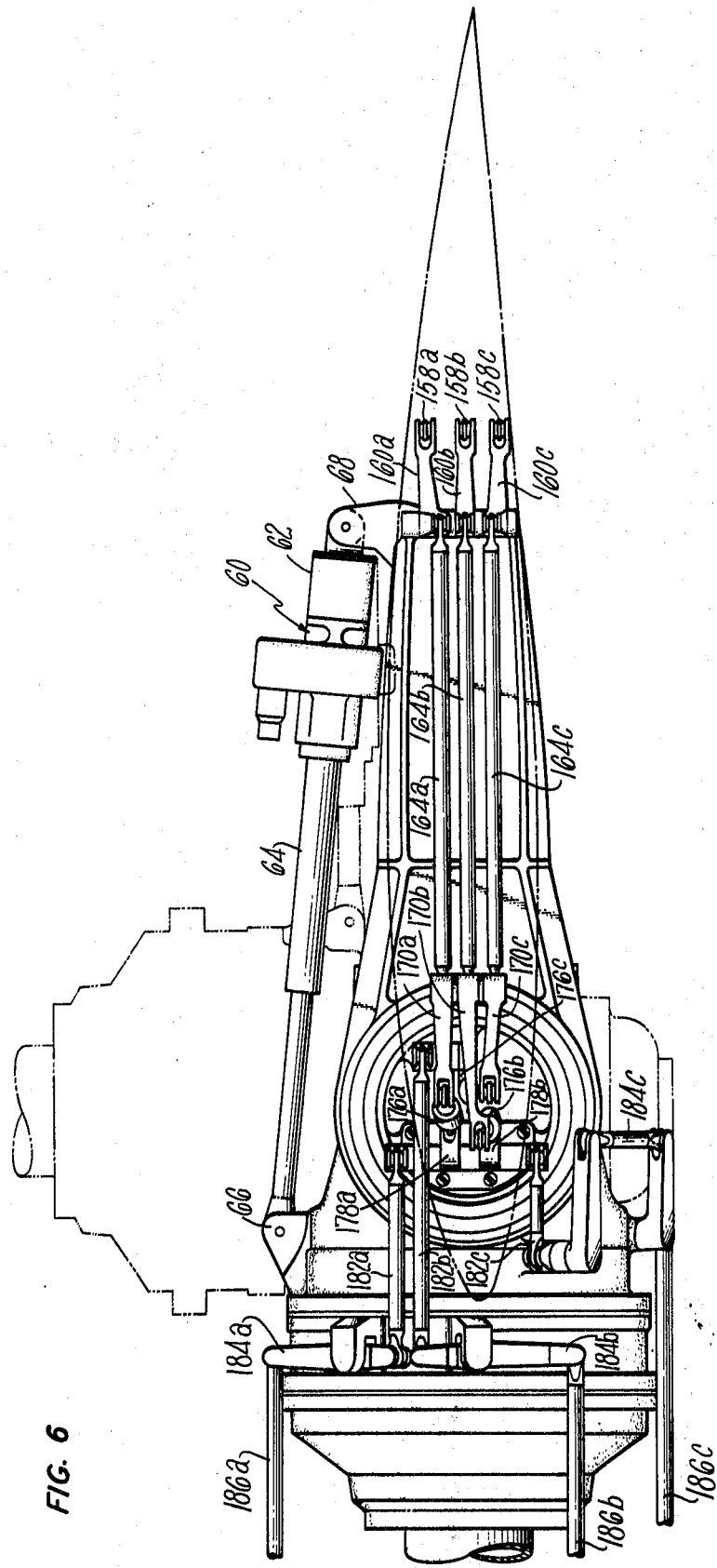
FIG. 6 is a view taken from line 6—6 of FIG. 4B to better illustrate the rotor blade pitch change control linkage chain.

By viewing FIGS. 4 and 6, the mechanism by which input motion signals are provided to the three main servos such as 124, to either translate or tilt swash plate assembly 114 to vary blade pitch is shown. In a conventional fashion and as best shown in FIGS. 4 and 6 signals from the pilot sticks 152 are transmitted through mixing linkage or mixer 154 auxiliary servos 156 to provide motion signals to links 158a, 158b, and 158c. Links 158 are pivotally connected as shown to bell cranks 160a, 160b, and 160c, all of which are supported at pivot points 162 to pod portion 50 of wing tip 16. Cranks 160 are in turn pivotally connected as shown to links 164a, 164b, and 164c, which links are in turn pivotally connected at pivot points 166 to bell cranks 170a, 170b, and 170c. Bell cranks 170 are pivotally connected at pivot points 172 to fixed pod portion 50. The link and bell crank chain 158–170 constitute the stationary portion 174 of the swash plate actuating system. Bell cranks 170 are pivotally connected as shown to twist links 176a, 176b, and 176c. It is an important teaching of this invention that twist links 176 extend substantially along pod tilt axis 58 or are closely clustered thereabout so that the tilting of pod tiltable portion 52 about axis 58 does not introduce inadvertent pitch change to the blades 40. Twist links 176 are in turn pivotally connected to bell cranks 178a, 178b, and 178c, which are individually pivotally attached at pivot points such as 180 to the transmission housing 70. The opposite ends of bell cranks 178 are pivotally connected to links 182a, 182b, and 182c, which are in turn pivotally connected either through pivot links 184a and 184b or link and bell crank chain 184c to rods 186a, 186b, and 186c, which are substantially equally positioned circumferentially about axis 28 and each pivotally connects to one of the main servos, such as 124 at pivot point 188. In this fashion, the coaction of pilot sticks 152, mixing linkage 154, auxiliary servos 156, and link-bell crank chain 158–186 and servos 124 serve to cause swash plate assembly 114 to either translate or tilt so as to vary the pitch of blades 40 either collectively or cyclically, respectively.

Figure 7:
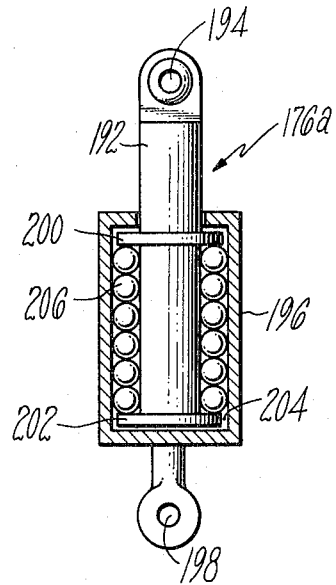
FIG. 7 is a cross-sectional showing of the twist links used in the pitch change control mechanism illustrated in FIGS. 4 through 6.

The construction of twist links 176a, 176b, and 176c is shown in greater particularity in FIG. 7. Twist links such as 176a shown in FIG. 7 serve the important function of joining the fixed portion 174 of the pitch change link-bell crank chain 158–150 and the movable portion 190 thereof, which consists of link-bell crank chain 178–186, and which is tiltable about axis 58 with pod 34. Twist links 176 include a first member 192 which is adapted to be pivotally connected at pivot point 194 to either fixed link-bell crank chain 174 or movable link-bell crank chain 190 and which is rotatably or twistably received within cylindrical member 196, which is adapted to be pivotally connected to either chain 174 or 190 at pivot point 198. Member 192 is substantially a shaft member with ring flanges 200 and 202 projecting in spaced relation therefrom so as to be received within the hollow cylindrical chamber 204 of second member 196, with ball members 206 cooperating therebetween to form a friction-free twistable joint, thereby permitting the transmission of linear motion between link-bell crank chains 174 and 190 while accommodating the necessary relative rotary motion which must take place therebetween when pod portion 52 tilts about axis 58.

Since rotor 20 is intended for use on a compound aircraft such as the triveri-plane shown in FIGS. 1, 2, and 3, blades 40 must be capable of folding with respect to rotor hub 96 and provisions are therefore made to fold blades 40 between their FIG. 4A solid line, normal rotor operating position and their FIG. 4A folded or stowed position, shown in phantom. The blade folding occurs about axis 100 which is also the blade flapping axis. Blade folding is caused to occur by coaction of jack screw 210, which is oppositely threaded at its after section 212 and its forward section 214, and nut member 216 which threadably engages section 212. Jack screw 210 is driven by reversible motor 218 so that when jack screw portion 212 is cause to rotate in one direction, nut 216 is caused to translate between its FIG. 4A solid line position assumed during normal rotor operation with the rotor blades 40 extended and its FIG. 4A phantom line position, which is its position when blades 40 are folded as shown in phantom in FIG. 4A. Nut 216 is supported for rotation by translating carriage or sleeve member 220, which is in turn supported from jack screw 210 by bearing 222, and includes equally spaced projections 224, one for each blade 40. A breakable over-centered link 226 is pivotally connected to each projection 224 at pivot point 228 and to blade 40 at pivot point 230, which is offset from folding axis 100 by arm 232. Over-centered link 226 includes a pivot joint 234 between its end points and is urged toward support sleeve 220 by spring 236. With nut 216 in its FIG. 4A solid line position, over-center link 226 is broken so as not to interfere with the normal flapping motion of blades 40. As electric motor 218 causes jack screw 210 to rotate so as to move nut 216 from its FIG. 4A solid line, rotor operative position to its FIG. 4A phantom line, blade folded position, link 226 will straighten and move pivot point 230 forward so as to cause blades 40 to pivot about their folding axes 100 and so that with the blades fully folded as shown in phantom in FIG. 4, spring 236 will cause over-center link 226 to lock when blades 40 are in their folded positions. If the blades are in their folded positions and it is desired to bring the blades to their operable positions, motor 218 causes jack screw 210 to rotate in the opposite direction to cause the blades to unfold as pivot connection 230 moves from its phantom FIG. 4 to its solid line FIG. 4 position and when rotor 20 is eventually rotated, the centrifugal force acting upon link 226 will overcome the force of spring 236 to break the link at pivot joint 234 to thereby free blade 40 for flapping without interference from link 226 and the blade fold mechanism.

It will be noted that the forward portion of jack screw 210, namely portion 214 which is oppositely threaded from portion 212 is threadably connected to nut 240, which is in turn connected by support 242 to nose cone 56. In view of this connection, as jack screw 210 rotates, the nose cone 56 is caused to translate along axis 28 between its FIG. 4A solid line, stowed rotor position and its FIG. 4A phantom, rotor operable position so that the nose cone does not interfere with the folding motion of blades 40. Scissors 244 is pivotally connected to hub 96 and nose cone 56 so as to prevent rotation therebetween.

It will accordingly be seen that through the coaction of reversible electrical motor 218, jack screw 210, and nuts 216 and 240, and over-center breakable link 226, blades 40 may be pivoted about folding axis 100 to their FIG. 4 phantom line position with nose cone 56 abutting pod tiltable portion 52 at the open end 54 thereof so as to cooperate therewith in defining a smooth aerodynamic surface over rotor 20, and its support and actuating mechanism. If motor 218 is caused to rotate in the opposite direction, blades 40 will fold about axis 100 to their solid line FIG. 4 positions, while nose cone 56 will translate forward to its FIG. 4 solid line position, thereby providing the necessary space for blades 40 to move in without interference from the nose cone 56.

It will be noted that pod 34 includes recesses such as 219 along axis 28 in which blades 40 nest when folded to present minimum aerodynamic drag (see FIG. 5).

Because rotor 20 is capable of use with a helicopter wherein the rotor blades must be folded in flight from their FIG. 2 position to their FIG. 3 position, and because it is important that the blades assume the position of minimum drag during both the folding and unfolding operations and when nested against pod 34, it is necessary to control the pitch of the blades during the folding and unfolding operations. So that there is no interference between the normal flight operation pitch control system including swash plate assembly 114, it is important that the first pitch control system be made ineffective during the operation of the blade fold pitch control system.

The blade fold pitch control system and its relation to the normal rotor operation pitch control system is shown in FIG. 9 wherein, as more fully explained in U.S. Pat. No. 3,199,601, the output from the pilot cyclic pitch and collective pitch sticks 152 is provided to swash plate assembly 114 through mixer unit 154, auxiliary servos 156 and main servos 124. Swash plate assembly 114 causes blades 40 to change pitch due to the coaction of link-bell crank chain 130–150 between. These elements constitute the normal rotor operation pitch control system and operate as previously described.

As previously stated, it is highly desirable to maintain the pitch of blades 40 in their minimum drag positions both during the folding and unfolding operations and when the blades are nested in their fully folded position. It has been found that blades 40 present minimum drag during the folding and unfolding operations when in their fully feathered positions and it is accordingly desirable to maintain the blades in their fully feathered position during the majority of the folding and unfolding operation. It is an important feature of this invention that during the blade folding operations the blades 40 be maintained in their fully feathered position for approximately the first 80° of the folding operation and that they change pitch to assume their optimum pitch position for their finally nested position as they travel through the final 10° of folding arc. Conversely, as the blades are being unfolded their pitch is caused to change during the first 10° of unfolding arc so that they are at their fully feathered position at that time and then remain at that fully feathered position through the remaining 80° of unfolding arc to their FIG. 4 solid line operable position.

To provide the blade fold and unfold pitch control system, linear actuators 250, 252, and 254 are positioned in the three lines between the three auxiliary servos 156 and the three main servos 124 and are controlled to provide linear outputs to the three main servos 124 to effect the pitch change operation during the blade folding and unfolding operations. It is important that the normal rotor operation blade pitch control system be ineffective when the blade fold or auxiliary blade pitch control system is in operation and accordingly, when the pilot wishes to fold or unfold the blades 40 he manipulates his pilot sticks 152 so as to center and lock the control rods at auxiliary servos 156 and turns off the hydraulic pressure thereto or otherwise incapacitates the normal rotor operation pitch control system and this condition is sensed at control panel 256, so as to energize signal means 258.

Assuming initially that the blades are in their folded, FIG. 4 phantom position with control panel 256 so energized and the normal operation pitch control system inactivated, the pilot actuates blade fold motor 218 and the initial blade motion out of recess 219 actuates microswitch 260, which is positioned on pod 34 in recess 219 so as to be depressed when the blades are in their fully folded position, and this actuation of microswitch 260 sends an electrical signal to the control panel 256 to cause an actuating signal to be sent to the reversible drive motors 262, 264, and 266 of the linear actuators 250, 252, and 254, thereby feeding inputs to the main servos 124, swash plate 114 and pitch change mechanism 130–150 so as to change the pitch of blades 40 from their predetermined pitch setting in their nested position to their full feathered pitch position. Motors 262–266 are programmed in conventional fashion through control panel 256 to complete their pitch change function when blades 40 have unfolded some selective number of degrees, such as ten degrees, at which time blades 40 are to be in their fully feathered position and remain in this fully feathered position as motor 218 causes the blades to unfold the remainder of the fold arc until they eventually reach their rotor operational FIG. 4 solid line position.

When the rotor is in its propeller mode operating position shown in FIG. 2 where the cyclic stick inputs of pitch and roll to the auxiliary servos have been deactivated by centering and with the hydraulic pressure thereto shut off, the pilot brings his collective stick to the full feather position, where he locks this control rod to the auxiliary servo, while making appropriate power transfer from the rotor 20 to the jet engines 18, he next shuts off hydraulic pressure to cause the normal operating pitch control system to become ineffective and then actuates blade fold motor 218. As previously described, it is desirable to maintain blades 40 in their full feathered position during the major portion of their folding arc, approximately 80° of the total 90° folding arc thereof and as just described the pilot has put blades 40 in their full feathered position before commencing blade folding. When rotor blades 40 fold through the major portion of their arc and are at about the 80° fold position, the position of nut 216 between bosses 224 causes microswitch 270 to be actuated and thereby send an electric signal to control panel 256 which causes reversible motors 252, 264, and 266 to actuate linear output members 250–254 so as to actuate the main servos 124 to change the pitch of blades 40 to bring them to their optimum nesting angle before they arrive at their final nesting position best shown in FIGS. 4 and 5 in phantom. Again, rotors 262–266 are programmed through control panel 256 to be de-energized when blades 40 are in their fully folded positions.

We claim:

1. An aircraft having a forward end and an afterend and including:
   (a) at least one tiltable pod having a first end and being mounted on said aircraft for tilting about a pod tilt axis between a first position wherein said pod is extending substantially vertically with said first end in a vertically upper location and a second position wherein said pod is extending substantially horizontally with said first end in a forward location,
   (b) a plural bladed rotor projecting from said pod at said first end and mounted therefrom for rotation about an axis of rotation and with each of said blades mounted for pitch change variation and blade folding toward said pod and blade unfolding away from said pod,
   (c) a movable nose cone mounted on said pod at said first end adjacent said rotor and outward thereof from said pod for translation with respect to said pod and rotor,
   (d) means to fold and unfold said blades with respect to the remainder of said rotor and pod and to cause said nose cone to translate toward said pod in response to blade folding motion and away from said pod in response to blade unfolding motion so as not to interfere with said blades and said rotor during the blade folding and unfolding operations.

2. Apparatus according to claim 1 and including means to selectively vary the pitch of said blades during the blade folding and unfolding operations.

3. Apparatus according to claim 1 and including first means to vary the pitch of said blade during normal rotor operation and second means to vary the pitch of said blades during the blade folding and unfolding operations.

4. Apparatus according to claim 3 wherein said first and second blade pitch varying means are independent of one another in operation.

5. Apparatus according to claim 4 including means to tilt said pod about a pod tilt axis between a vertical position wherein said rotor serves as a helicopter rotor and a horizontal position wherein said rotor serves as an aircraft propeller.

6. Apparatus according to claim 5 wherein said first blade pitch change means comprises a link-bell crank chain with at least one link extending substantially along the pod tilt axis.

7. Apparatus according to claim 1 and wherein said blades are supported from said rotor for flapping about a flapping axis and including means to vary the pitch of said blades including a link-bell crank chain having at least one link coincident with and translatable along said blade flapping axis so that blade flapping does not introduce inadvertent pitch change.

8. An aircraft having a forward end and an afterend and having:
   (a) a fuselage,
   (b) fixed wings projecting laterally on opposite sides of the fuselage,
   (c) a tiltable pod having a first end and being mounted at the tip of each of said wings so as to be pivotable about a pod tilt axis between a first position wherein said pod is extending substantially vertically with said first end in a vertically upper location and a second position wherein said pod is extending substantially horizontally with said first end in a forward location,
   (d) a multi-bladed rotor mounted for rotation about an axis of rotation and projecting from said pod at said first end and having a plurality of blades projecting radially from said rotor and mounted therefrom so as to be capable of pitch change variation and blade folding with respect to said rotor about a blade fold axis toward said pod and blade unfolding away from said pod,
   (e) a nose cone attached to said pod first end outward of said rotor and forming the outer tip of each of said podes and mounted for translation along said axis of rotation relative thereto,
   (f) first means to cause said blades to change pitch during normal flight operation,
   (g) means to cause said blades to fold toward said pod and unfold away from said pod with respect to said rotor between an operating and a folded position and to cause said nose cone to translate toward said pod in response to blade folding and away from said pod in response to blade unfolding so as not to interfere with said blades and rotor during the blade folding and unfolding operation.

9. Apparatus according to claim 8 wherein said blades are also mounted for flapping motion with respect to said rotor about a flapping axis and wherein said flapping axis and said fold axis of each blade are coincident.

10. Apparatus according to claim 9 and wherein said pitch change means includes a swash plate mounted for rotation with said rotor and further mounted to be tiltable and translatable with respect thereto.

11. Apparatus according to claim 10 and including means connecting said swash plate to said blades so that swash plate motion will cause blade pitch variation.

12. Apparatus according to claim 11 wherein said pitch change means connecting said swash plate to the blades includes a chain of pivotally connected links, one of which is coincident with and translatable along said blade flapping axis so that blade flapping motion does not introduce inadvertent pitch change.

13. An aircraft having:
   (a) a fuselage,
   (b) fixed wings projecting laterally on opposite sides of the fuselage,
   (c) a tiltable pod mounted at the tip of each of said wings so as to be pivotable about a pod tilt axis between a vertical position and a horizontal position,
   (d) a multi-bladed rotor mounted for rotation about an axis of rotation and projecting from said pod and having a plurality of blades projecting radially from said rotor and mounted therefrom so as to be capable of pitch change variation and blade folding with respect to said rotor about a blade fold axis,
   (e) a nose cone attached to and forming the outer tip of each of said pods and mounted for translation relative thereto,
   (f) first means to cause said blades to change pitch during normal flight operation including:
      (1) a swash plate mounted for rotation with said rotor and further mounted to be tiltable and translatable with respect thereto,
      (2) means connecting said swash plate to said blades so that swash plate motion will cause blade pitch variation,
      (3) and including a plurality of servo motors connected to said swash plate to cause translation and tilting thereof,
   (g) means to cause said blades to fold and unfold with respect to said rotor between an operating and a folded position and to cause said nose cone to translate with respect to said rotor so as not to interfere with said blades and rotor during the blade folding and unfolding operation,
   (h) and wherein said blades are also mounted for flapping motion with respect to said rotor about a flapping axis and wherein said flapping axis and said fold axis of each blade are coincident.

14. Apparatus according to claim 13 and including a mechanical link chain connected to said servo motors to provide signal input motions thereto and thereby cause tilting or translating of said swash plates to effect blade pitch variation and including a link section substantially coincident with said pod tilt axis.

15. Apparatus according to claim 14 wherein said tiltable pod includes:
   (a) a fixed portion attached to the tip of said wing,
   (b) and a tiltable portion mounted forward thereof at the tip of said wing so as to be tiltable about a pod tilt axis between a vertical position and a horizontal position,
   (c) and wherein said mechanical link chain which provides pitch change signal input motions to said servos includes:
      (1) a plurality of pivotally linked rods and belt cranks including:
         (a) a first portion which is fixed and attached to the fixed portion of said pod,
         (b) a second portion which is attached to and tilts with the tilting portion of said pod,
         (c) and including at least one twist link connecting said fixed and moveable portions of said link and bell crank chain and extending substantially along said pod tilt axis.

16. Apparatus according to claim 15 wherein said pitch change means includes three substantially equally spaced servo motors positioned along said rotor axis of rotation and pivotally connected to said swash plate and further includes three chains of pivotally connected rod and bell cranks with one attached to each servo motor to transmit pitch change signals thereto and with each chain including a twist link extending substantially along the pod tilt axis so that the three twist links are clustered about the pod tilt axis and still further including three additional chains of pivotally connected rods and bell cranks connecting said swash plates to said blades and which additional chains include at least one link coincident with and translatable along said blade flapping axis, and wherein said swash plate, said servo motors, and said link-bell crank chains are enveloped within said tiltable pod.

17. An aircraft having:
   (a) a fuselage,
   (b) fixed wings projecting laterally on opposite sides of the fuselage,
   (c) a tiltable pod mounted at the tip of each of said wings so as to be pivotable about a pod tilt axis between a vertical position and a horizontal position,
   (d) a multi-bladed rotor mounted for rotation about an axis of rotation and projecting from said pod and having a plurality of blades projecting radially from said rotor and mounted therefrom so as to be capable of pitch change variation and blade folding with respect to said rotor about a blade fold axis,
   (e) a nose cone attached to and forming the outer tip of each of said pods and mounted for translation relative thereto,
   (f) first means to cause said blades to change pitch during normal flight operation,
   (g) means to cause said blades to fold and unfold with respect to said rotor between an operating and a folded position and to cause said nose cone to translate with respect to said rotor so as not to interfere with said baldes and rotor during the blade folding and unfolding operation,
   (h) and wherein said blade folding and unfolding means includes a motor driven jack screw having oppositely threaded portions with one of the threaded portions connected to said nose cone and the other threaded portion connected to said blades so that as said motor is driven in one direction, said jack screw causes said blades to move from their operating position to their folded position and causes said nose cone to cover said rotor, and when said motor is driven in the opposite direction, said blades are caused to move from their folded position to their operating position and said nose cone is caused to move away from said rotor so as not to interfere with blade motion.

18. Apparatus according to claim 17 wherein said blade fold and unfold means includes:
   (a) a nut member threadably engaging one portion of jack screw and translatable therealong,
   (b) and a plurality of jointed over-center links each connecting the nut to each of said blades, and being of selected size so that said over-center links transmit tensile and compressive forces between said nut and said blades during said blade folding and unfolding operation and so that said over-center links, so broken, do not interfere with blade flapping motion.

19. Apparatus according to claim 18 wherein said blade fold and unfold means further includes:
   (a) nut member threadably engaging the other portion of said jack screw,
   (b) support means connecting said nut to said nose cone so that as said jack screw is driven in one direction so as to unfold the rotor blades, the nose cone moves away from the tiltable pod so as not to interfere with blade motion and so that when said jack screw is rotated in the opposite direction said nose cone moves toward and abuts said tiltable pod to cover said rotor and cooperate with said pod to define a smooth aerodynamic surface against which said blades nest when folded.

20. Apparatus according to claim 19 and including second means to cause said blades to change pitch during the blade folding and unfolding operation.

21. Apparatus according to claim 20 wherein said second blade pitch change means causes said blades to remain in their full feathered position during the major portion of the blade folding operation and to change pitch to a selected blade nesting position during the final portion of the blade folding operation and wherein said second blade pitch change means causes said blades to change pitch to their full feathered position during the initial and minor portion of the blade unfolding operation and to remain in the full feathered position during the remaining and major portion of the blade unfolding operation.

22. Apparatus according to claim 21 wherein the blades rotate through approximately 90° about the blade folding axis in each of the blade folding and operations and wherein the major portion thereof wherein the blades are maintained in the full feathered position extends through substantially 80° thereof.

23. An aircraft including:
   (a) at least one tiltable pod mounted on said aircraft and including:
      (1) a fixed portion fixed to said aircraft,
      (2) a tiltable portion mounted on said aircraft for tilting about the pod tilt axis between a first and second position,
   (b) a multi-bladed rotor projecting from said pod tiltable portion and mounted therefrom for rotation about an axis of rotation and with each of said blades mounted for pitch change variation,
   (c) means to vary the pitch of said blades including a link-bell crank chain extending across said fixed and tiltable portions of said pod and including:
      (1) at least one twist link extending substantially along said pod tilt axis.

24. Apparatus according to claim 23 wherein said blades are supported from said rotor for flapping about a flapping axis and wherein said blade pitch varying means link-bell crank chain further includes at least one link coincident with and translatable along said blade flapping axis so that blade flapping does not introduce inadvertent pitch change.

25. A convertiplane capable of operating in fixed-wing mode, helicopter mode and propeller mode including:
   (a) a fuselage, (b) fixed wings projecting laterally on opposite sides of said fuselage, (c) a tiltable pod mounted at the tip of each of said wings so as to be pivotable about a pod tilt axis between a vertical position for helicopter mode of operation, and a horizontal position for propeller mode of operation, (d) a multi-bladed rotor mounted in each of said pods for rotation about an axis of rotation and projecting therefrom and including:

(1) a plurality of blades projecting radially from said rotor and mounted therefrom so as to be capable of pitch change variation and blade flapping about a blade flapping axis, (e) first means to cause said blades to change pitch during normal flight operation including a chain of pivotally connected rods and bell cranks with at least one rod thereof coincident with said pod tilt axis and another rod thereof coincident with and translatable along said blade flapping axis so that blade flapping and pod tilting do no introduce inadvertent pitch change.

26. Apparatus according to claim 25 and:

(a) wherein said blades are also mounted on said rotor for folding about a blade folding axis between an operable position and a stowed position, (b) and including means to cause said blades to fold with respect to said rotor between a normal rotor rotor operating position wherein said convertiplane is in helicopter mode of operation when said tiltable pod is in said vertical position and wherein said convertiplane is in a propeller mode of operation when said tiltable pod is in said horizontal position and a folded position wherein said convertiplane is in fixed-wing mode of operation when said tiltable pod is in said horizontal position, (c) and further including engine means to power said convertiplane during the fixed-wing mode of operation and to drive said rotor during both the helicopter and propeller modes of operation.

27. Apparatus according to claim 26 and including second means to cause said blades to change pitch during the blade pitch folding operation.

28. Apparatus according to claim 27 and including a nose cone attached to and forming the outer tip of each of said tiltable pods and mounted for translation relative thereto and wherein said blade fold and unfold means also causes said nose cone to translate with respect to said rotor and pod so as not to interfere with said blades and rotor during the blade folding and unfolding operation and so as to cooperate with said pod to define a smooth aerodynamic surface therewith when said convertiplane is in said fixed-wing mode of operation.

29. Apparatus according to claim 1 wherein said pod is shaped to define a plurality of recesses extending therealong parallel to said rotor axis of rotation and positioned so that said blades will nest into said recesses when in their folded positions.

30. Apparatus according to claim 1 and including means to prevent said nose cone from rotating relative to said rotor.

31. Apparatus according to claim 8 and including:

(a) motor means, (b) means connecting said motor means to power said rotor including:

(1) a transmission housing enveloping a transmission and being tiltably connected to the tip of each wing and connected to said tiltable pod so that as said transmission tilts about said pod tilt axis, said pod will also so tilt, (2) drive-shaft means connecting said engine means to each of said transmissions, (3) a rotor drive-shaft connecting each of said transmissions to one of said rotors, (4) a support bearing enveloping said shaft, (5) and truss support means supported from said transmission housing and projecting therefrom and supporting said support bearing in support relation to said rotor drive-shaft.

32. Apparatus according to claim 23 and wherein said blades are mounted for blade folding and unfolding and further including:

(a) a nose cone attached to and forming the outer tip of each of said pods and mounted for translation relative thereto, (b) and means to cause said blades to fold and unfold with respect to said rotor between an operating and a folded position and to cause said nose cone to translate with respect to said rotor so as not to interfere with said blades and rotor during the blade folding and unfolding operation.

33. Apparatus according to claim 23 wherein said twist link comprises a flanged shaft member enveloped within a cylindrical member.

References Cited
UNITED STATES PATENTS

| | | | |
|---|---|---|---|
| 3,254,725 | 6/1966 | Higgins | 244—7 |
| 3,370,809 | 2/1968 | Leoni | 244—7 |
| 3,404,852 | 10/1968 | Sambell et al. | 244—7 |

TRYGVE M. BLIX, Primary Examiner

U.S. Cl. X.R.

244—66